United States Patent [19]
Huang

[11] Patent Number: 5,117,341
[45] Date of Patent: May 26, 1992

[54] MULTI-FUNCTION FLASHLIGHT

[76] Inventor: Tien-Tsai Huang, No. 4, Lane 30, Wu-Chang St., Pan-Chiao City, Taiwan

[21] Appl. No.: 746,633
[22] Filed: Aug. 19, 1991
[51] Int. Cl.⁵ .................................. F21C 1/00
[52] U.S. Cl. .................................. 362/184; 362/205; 362/208
[58] Field of Search .............. 362/184, 202, 205, 208, 362/32

[56] References Cited
U.S. PATENT DOCUMENTS

| | | | |
|---|---|---|---|
| 1,645,487 | 10/1927 | Harling | 362/184 |
| 2,538,332 | 1/1951 | Schaefer | 362/184 |
| 2,823,300 | 2/1958 | Graubner | 362/208 |
| 2,838,750 | 6/1958 | Rose | 362/208 |
| 2,900,493 | 8/1959 | Cheno | 362/184 |

Primary Examiner—Richard R. Cole

[57] ABSTRACT

A flashlight has an elongated barrel and two light bulbs respectively disposed on two ends of the barrel. A tubular cap is mounted on one end of the barrel and has a clamping member provided therein. A translucent acrylic indicator rod has one end portion extending into an open end of the tubular cap and is retained therein by the clamping member. A switch unit is operated so as to electrically connect a selected one of the light bulbs to a power source provided inside the barrel. The flashlight can be effectively used as a lighting aid or as a signaling tool.

2 Claims, 3 Drawing Sheets

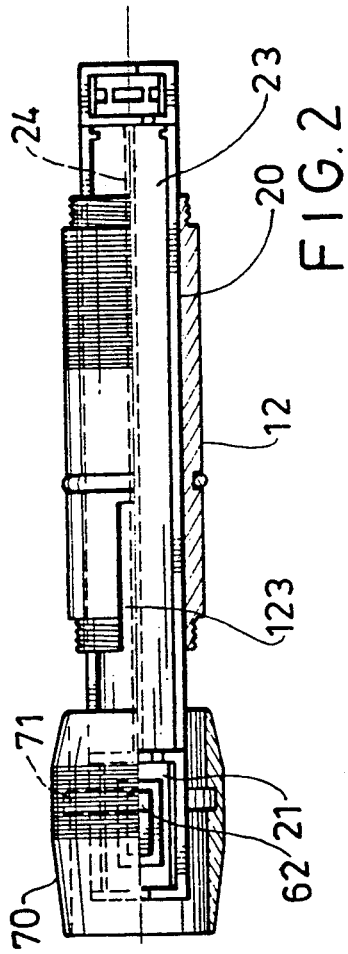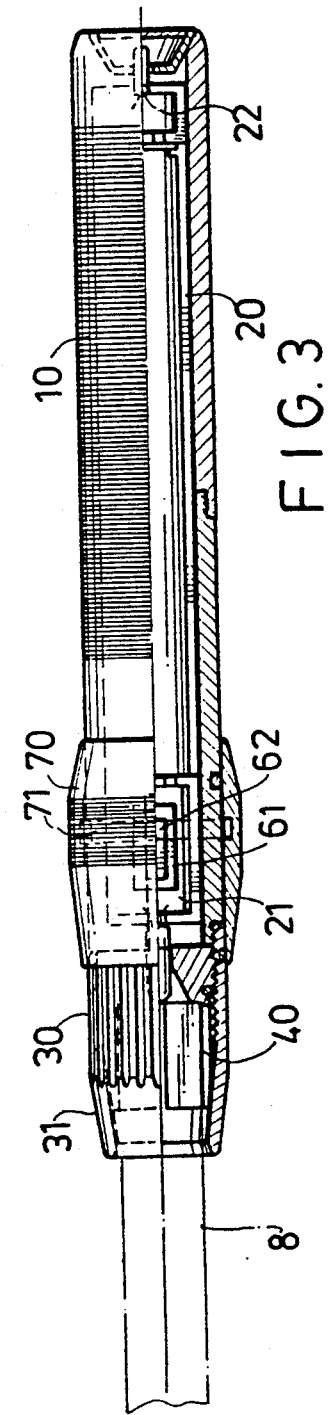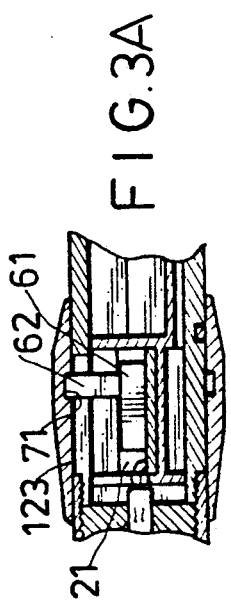

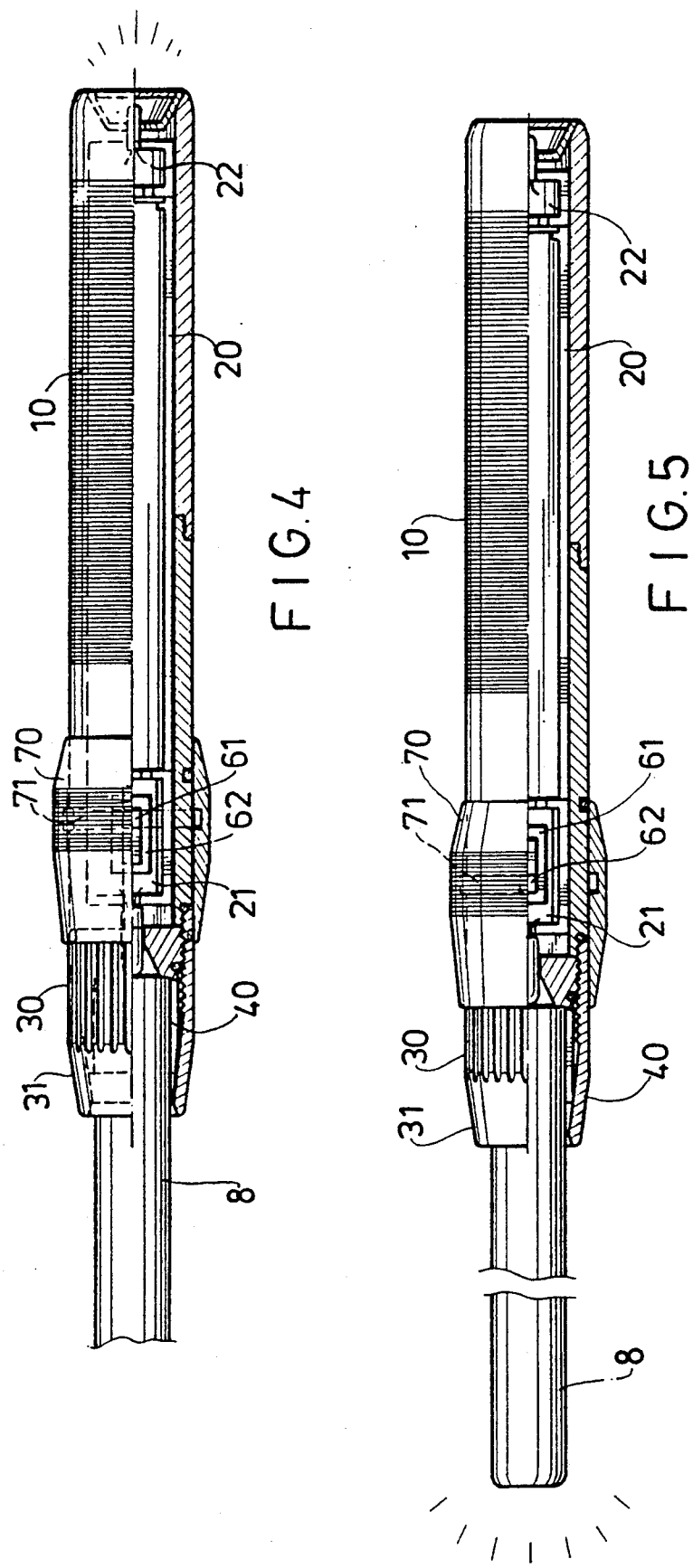

MULTI-FUNCTION FLASHLIGHT

BACKGROUND OF THE INVENTION

1. Field of the Invention

The invention relates to a flashlight, and more particularly to a new flashlight construction which can be effectively used as a lighting aid or as a signaling tool.

2. Description of the Related Art

Presently, most conventional flashlights can only be used as lighting aids and are seldom used as effective signaling tools because the intensity of light output is insufficient for relatively far distances.

SUMMARY OF THE INVENTION

Therefore, the main objective of the present invention is to provide a new flashlight construction which has two distinct light outputs so that it can be effectively used as a lighting aid or as a signaling tool.

Accordingly, the preferred embodiment of a multi-function flashlight of the present invention comprises: an elongated barrel having a first open end provided with a concave condenser piece and a lens covering one end of the condenser piece, and a second open end provided with an axially extending slide notch; an elongated battery seat disposed inside the elongated barrel, having a pair of lamp compartments respectively provided on the two end portions of the battery seat and an intermediate battery receiving portion to receive a power supplying cell means; a tubular cap having two open ends, one of the open ends being screwed into the second open end of the barrel; a clamping member provided inside the tubular cap, having a solid cylindrical portion mounted on the tubular cap and an annular wall portion extending outwardly and coaxial with the cylindrical portion, the annular wall portion confining a receiving space accessible from the other open end of the tubular cap and being provided with a plurality of axially extending partition notches, the cylindrical portion being provided with a light bulb through opening communicated with the receiving space; a translucent acrylic indicator rod having one end portion extending into the receiving space through the other open end of the tubular cap and being tightly clamped thereat by the annular wall portion of the clamping member; a pair of lamp means one provided in each of the lamp compartments, one of the lamp means having a light bulb passing through the condenser piece, the other one of the lamp means having a light bulb extending into the light bulb through opening; a switch unit provided on one of the lamp compartments, the switch unit being electrically connected to both of the lamp means and to the cell means, the switch unit including a manually operated slide body extending into the axially extending slide notch and movably operated so as to connect a selected one of the lamp means to the cell means in order to activate the selected lamp means; and a tubular switch actuator slidably sleeved on the elongated barrel and having an internal wall surface provided with an annular groove to receive a distal end of the slide body. The two lamp means permit the operation of the preferred embodiment as a lighting aid or as a signaling tool.

BRIEF DESCRIPTION OF THE DRAWINGS

Other features and advantages of the present invention will become apparent in the following detailed description of the preferred embodiment with reference to the accompanying drawings, of which:

FIG. 2 is a partially assembled view of the preferred embodiment;

FIG. 3 is a partially sectional view of the preferred embodiment when fully assembled;

FIG. 3A is a sectional view illustrating a switch unit of the preferred embodiment;

FIG. 4 is a schematic view of the preferred embodiment when used as a lighting aid; and FIG. 5 is a schematic view of the preferred embodiment when used as a signaling tool.

DETAILED DESCRIPTION OF THE PREFERRED EMBODIMENT

Figure 1:
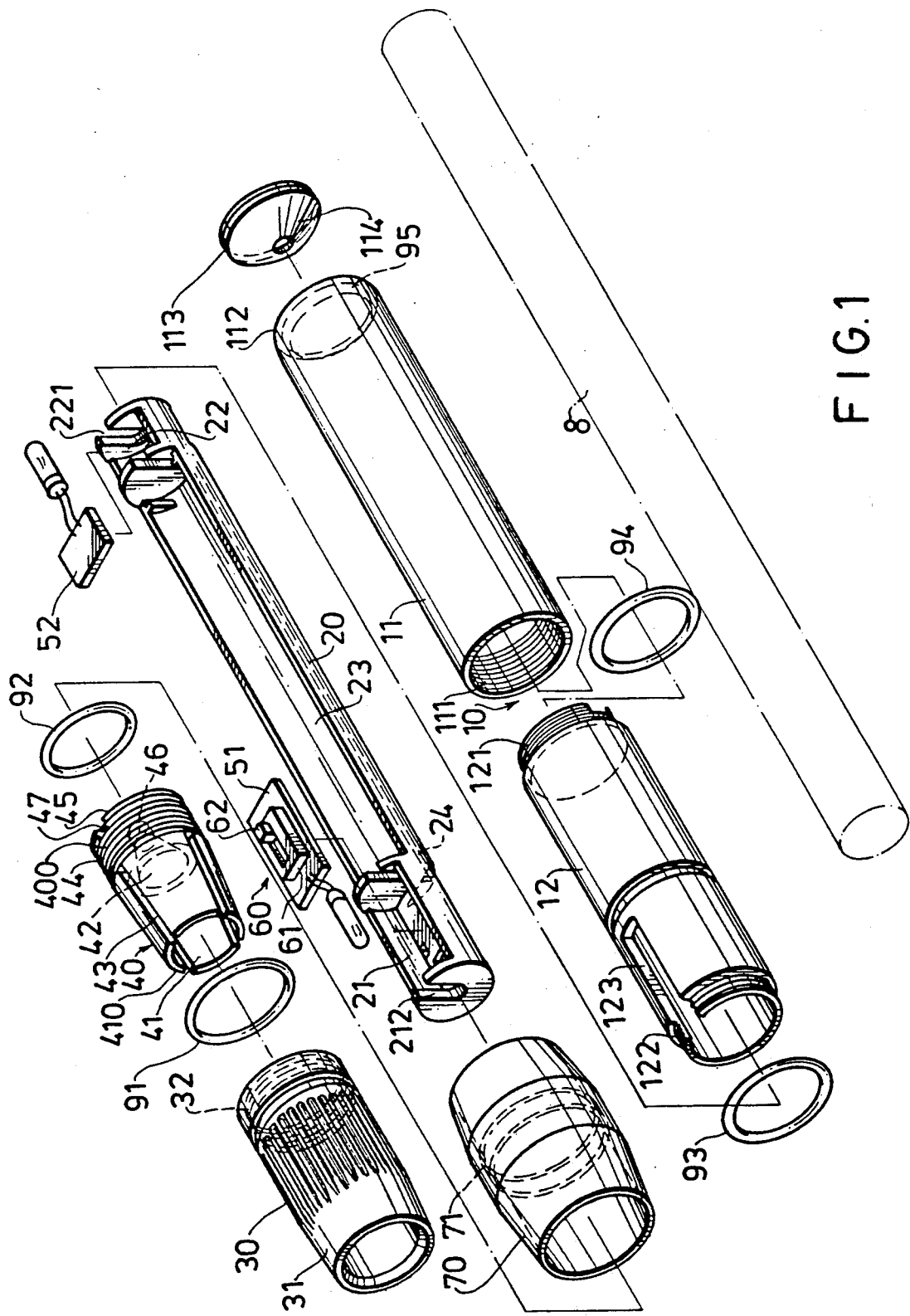
FIG. 1 is an exploded view of the preferred embodiment of a flashlight according to the present invention.

Referring to FIG. 1, the preferred embodiment of a flashlight according to the present invention is shown to comprise an elongated barrel 10, an elongated battery seat 20, a tubular cap 30, a clamping member 40, a pair of lamp means 51 and 52, a switch unit 60, and a tubular switch actuator 70.

The elongated barrel 10 includes a first barrel section 11 and a second barrel section 12. A first open end of the first barrel section 11 is provided with internal screw threads 111. A second open end 112 of the first barrel section 11 receives a concave condenser piece 114 and a lens 113 covering one end of the condenser piece 114. The two open ends of the second barrel section 12 are each provided with external screw threads, 121 and 122. The external screw threads 121 engage the internal screw threads 111 of the first barrel section 11. The end portion of the second barrel section 12 formed with the external screw threads 122 has an axially extending slide notch 123.

The battery seat 20 is disposed inside the elongated barrel 10 and has a pair of lamp compartments, 21 and 22, respectively provided on two end portions thereof, and an intermediate battery receiving portion 23 to receive a battery cell means (not shown). The battery seat 20 is provided with a wire receiving groove 24 extending between the lamp compartments, 21 and 22. Each of the lamp compartments, 21 and 22, has an outermost wall portion provided with an upright notch, 212 and 221.

The tubular cap 30 has first and second open ends, 31 and 32. The second open end 32 is provided with internal screw threads, an outer portion of which engages the external screw threads 122 of the second barrel section 12.

The clamping member 40 has a solid cylindrical portion 400 and an annular wall portion 410 extending outwardly and axially from the periphery of the cylindrical portion 400. The annular wall portion 410 confines a receiving space 41 and is provided with a plurality of spaced axially extending partition notches 43. The annular wall portion 410 preferably has resilient properties. One end 45 of the cylindrical portion 400 is provided with a light bulb opening 46. The light bulb opening 46 has a gradually expanding hole portion 42 communicated with the receiving space 41. The clamping member 40 is to be mounted inside the tubular cap 30. The cylindrical portion 400 is provided with external screw threads 44 to engage an inner portion of the internal screw threads on the second open end 32 of the tubular cap 30. One end portion of an acrylic indicator rod 8 extends into the receiving space 41 and is tightly clamped thereat by the annular wall portion 410.

The lamp means, 51 and 52, are respectively provided in the lamp compartments, 21 and 22, of the battery seat 20. Each of the lamp means, 51 and 52, includes a light bulb wired to an electrical circuit means disposed on a circuit board. The lamp means, 51 and 52, are wired to one another via conductors extending into the wire receiving groove 24 of the battery seat 20.

The switch unit 60 includes an electrical contact portion 61 and a manually operated slide body 62 wired to the electrical contact portion 61. The electrical contact portion 61 is mounted on the circuit board of the lamp means 51 and is electrically connected to the lamp means, 51 and 52, and to the battery cell means in the battery receiving portion 23 of the battery seat 20. The slide body 62 is movably operated to vary the operating mode of the preferred embodiment.

The tubular switch actuator 70 is slidably sleeved on the second barrel section 12. The internal wall surface of the switch actuator 70 is provided with an annular groove 71 to receive the tip of the slide body 62.

Assembly of the preferred embodiment is as follows: Referring to FIGS. 2, 3 and 3A, the lamp means 51 is first provided in the lamp compartment 21 of the battery seat 20 such that the light bulb thereof extends through the upright notch 212. The second barrel section 12 is then sleeved on the battery seat 20 such that the slide body 62 is aligned with the notch 123 of the second barrel section 12. The switch actuator 70 is then provided around the battery seat 20 so that the tip of the slide body 62 can extend into the annular groove 71 thereof. The lamp means 52 is placed on the lamp compartment 22 such that the light bulb thereof extends through the upright notch 221. The first barrel section 11 is then sleeved on the battery seat 20 and mounted to the second barrel section 12. The light bulb of the lamp means 52 extends through the condenser piece 114. The clamping member 40 is provided inside the tubular cap 30. The tubular cap 30 is then mounted on the second barrel section 12 so that the light bulb of the lamp means 51 extends into the light bulb opening 46 of the clamping member 40. Finally, one end of the acrylic indicator rod 8 is inserted into the open end 31 of the tubular cap 30 and is tightly clamped thereat by the clamping member 40. Sealing rings, 91, 92, 93 and 94, are provided at the various threaded sections so as to prevent water from reaching the battery seat 20. The switch actuator 70 is operated so as to correspondingly move the slide body 62 along the slide notch 123 of the second barrel section 12. The switch unit 60 is preferably a three-section switch type. This is to permit activation of a selected one of the lamp means, 51 and 52, and deactivation of the selected lamp means.

Referring to FIG. 4, when the preferred embodiment is to be used as a lighting aid, the switch actuator 70 is operated so as to move the slide body 62 to abut against one end of the slide notch 123 to thereby electrically connect the lamp means 52 and the battery cell means and therefore activate the former. To deactivate the lamp means 52, the switch actuator 70 is once more operated to move the slide body 62 to an intermediate position, thereby disconnecting the lamp means 52 from the battery cell means.

Referring to FIG. 5, when the preferred embodiment is to be used as a signaling tool, the switch actuator 70 is operated so as to move the slide body 62 to abut against the other end of the slide notch 123 to thereby electrically connect the lamp means 51 and the battery cell means and therefore activate the former. The indicator rod 8 is made of translucent acrylic. Thus, light rays from the light bulb of the lamp means 51 is condensed and passes along the entire length of the indicator rod 8, making it ideal for use as a signaling tool. The indicator rod 8 can be of any color. (Indicator rods of this type are known in the art and thus, a detailed description of the construction and the properties thereof will not be provided herein). To deactivate the lamp means 51, the switch actuator 70 is operated to move the slide body 62 back to the intermediate position, thereby disconnecting the lamp means 51 from the battery cell means.

The clamping member 40 can accommodate indicator rods of different dimensions. The clamping member 40 is further provided with a notch 47 at the end 45 thereof and used to facilitate insertion of the clamping member 40 into the tubular cap 30.

The advantages of using the preferred embodiment of a flashlight according to the present invention are as follows:

1. The preferred embodiment is multi-functional. It can be effectively used as a lighting aid or as a signaling tool.

2. The indicator rod can be easily inserted and uprooted from the clamping member to facilitate assembly and storage. The clamping member can accommodate different sizes of indicator rods.

3. The switch actuator protects the switch unit from damage. Furthermore, the switch unit can be easily and properly operated because the contact area between the switch actuator and the user's fingers is greater than that in conventional flashlights.

While the present invention has been described in connection with what is considered the most practical and preferred embodiment, it is understood that this invention is not limited to the disclosed embodiment, but is intended to cover various arrangements included within the spirit and scope of the broadest interpretation so as to encompass all such modifications and equivalent arrangements.

I claim:

1. A flashlight, comprising:
   an elongated barrel having a first open end provided with a concave condenser piece and a lens covering one end of said condenser piece, and a second open end provided with an axially extending slide notch;
   an elongated battery seat disposed inside said elongated barrel and having a pair of lamp compartments respectively provided on two end portions of said battery seat and an intermediate battery receiving portion to receive a power supplying cell means;
   a tubular cap having first and second open ends, one of said open ends being screwed onto said second open end of said barrel;
   a clamping member provided inside said tubular cap and having a solid cylindrical portion mounted on said tubular cap and an annular wall portion extending outwardly and coaxial with said cylindrical portion, said annular wall portion confining a receiving space accessible from the second open end of said tubular cap and being provided with a plurality of axially extending partition notches, said cylindrical portion being provided with a light bulb opening communicated with said receiving space;

a translucent acrylic indicator rod having one end portion extending into said receiving space through the second open end of said tubular cap and being tightly clamped thereat by said annular wall portion of said clamping member;

a pair of lamp means each being provided in one of said lamp compartments, one of said lamp means having a light bulb passing through said condenser piece, the other one of said lamp means having a light bulb extending into said light bulb opening; and a switch unit provided on one of said lamp compartments, said switch unit including a manually operated slide body extending into said axially extending notch of said elongated barrel and movably operated so as to activate a selected one of said lamp means.

2. The flashlight as claimed in claim 1, further comprising a tubular switch actuator slidably sleeved on said elongated barrel and having an internal wall surface provided with an annular groove to receive a distal end of said slide body.

* * * * *